Oct. 17, 1939.  F. S. DE LONG  2,176,250
TROLLING PLUG
Filed Sept. 20, 1938
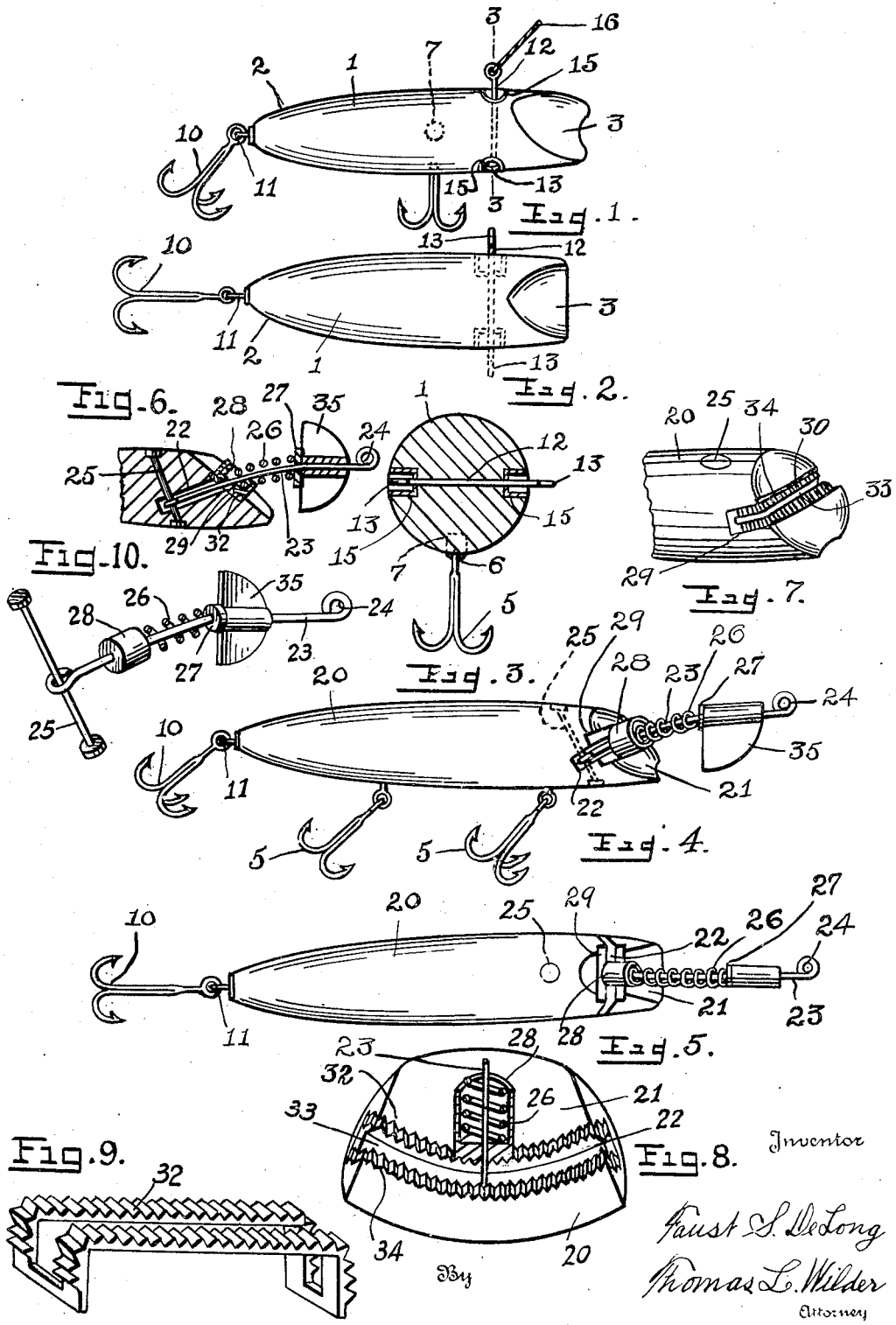
Inventor
Faust S. DeLong
Thomas L. Wilder
By Attorney Patented Oct. 17, 1939

2,176,250

UNITED STATES PATENT OFFICE 2,176,250

TROLLING PLUG

Faust S. De Long, Richfield Springs, N. Y.

Application September 20, 1938, Serial No. 230,831

4 Claims. (Cl. 43—46)

My invention relates to a trolling plug and I declare the following to be a full, clear, concise and exact description thereof sufficient to enable anyone skilled in the art to which it appertains to make and use the same, reference being had to the accompanying drawing in which like reference characters refer to like parts throughout the specification.

The object of the invention is to provide a trolling plug that will have the fishing line attached to it in such a manner as to conceal said line from the fish. To this end the line is secured to one side of the plug, whereby it will be not only concealed from the fish's vision but also tend to keep the plug away from the side of the boat when drawing in the line.

There is a modification showing means for holding the line at any angle within 180 degrees to the plug.

The object will be understood by referring to the drawing in which:

Fig. 1 is a perspective of the trolling plug.

Fig. 2 is a plan view of the same.

Fig. 3 is a section taken on the line 3—3 of Fig. 1.

Fig. 4 is a perspective of the modified form of the invention.

Fig. 5 is a plan view of the same.

Fig. 6 is a detail view showing a section of the modified form including a modification of the rudder, parts being broken away.

Fig. 7 is a detail enlarged view showing the front part of a still further modified form of the device, parts being broken away.

Fig. 8 is an enlarged front elevation of the modified form shown in Fig. 7, parts in section.

Fig. 9 is a detail view somewhat enlarged showing a perspective of a metal plate employed.

Fig. 10 is a detail view showing a perspective of a rudder and immediate parts employed.

Referring more particularly to the invention the trolling plug embodies a body member 1 that is cylindrical in cross section and tapers into a conical portion towards end 2. The front portion 3 is cut off at an angle to provide a front concaved facing surface disposed at an angle to the body portion. The plug is usually made of wood or any suitable material that will float or not as desired. A cluster of hooks 5 are attached by an eyelet 6 to the underside of body 1. Eyelet 6 is screw mounted to body 1. A countersunk cup shaped member 7 is embedded in body 1 adjacent the location of hook 5, whereby to allow the head of the hook 5 to disappear or nearly so into the body portion 1.

There is also a cluster of hooks 10 attached to body 1 by eyelet member 11 which is screw threaded to the rear end of body 1.

A member or rod 12 having eyelets 13, 13 is mounted crosswise in body 1 by being disposed through a loose aperture formed therein, whereby said member 12 can be pushed laterally into full or dotted line position shown in Fig. 2 but not clear of body 1. Cup members 15, 15 are countersunk in the body adjacent the location of eyelets 13, 13, whereby to conceal the eyelet 13 that is not being used. The fishing line 16 is attached to the extended eyelet 13 and the other eyelet 13 becomes concealed.

In operation member 12 will be pushed manually to one side or the other of body 1. Fishing line 16 will be attached to eyelet 13 that extends beyond body 1, whereby to aid in concealing said line 16 from the fish. When retrieving the trolling plug the pull on line 16 will tend to keep plug 1 away from the side of the boat, not shown.

The modified form shown in Figs. 4 and 5 embodies a body 20 having a front concaved surface 21 disposed at an angle to body 20. An open groove 22 is formed transversely across surface 21. Projecting within said groove 22 is a curved rod 23 having eyelet 24 formed on its free end for attaching a fishing line 16 thereto. The inner end of rod 22 is anchored or bent around rod 25 disposed in nearly vertical position in body 20. A coiled spring 26 is mounted on rod 23 and engages at one end washer or disc 27 mounted to slide on rod 23 and at the other end it is housed in cup 28 which is carried to slide on rod 23 and rests against the outer surface 21 of the end portion of body 20, whereby to hold rod 23 in predetermined adjusted position by friction. A countersunk open groove 29 is made in the front surface 21 of body 20, whereby to allow for the passage of cup 28 thereacross and past the corners.

Rod 23 can be held at any angle within one hundred and eighty degrees to body 20 by lifhting cup 28 against the tension of spring 26 and then swinging rod 23 to desired location and releasing cup 28.

In place of depending on friction alone, however, teeth 30 may be made integral with the outer surface 21 of body 20 when it is made of glass, or a metal plate 32 having an elongated opening 33 corresponding to groove 22 may be used. In this instance teeth 34 are formed on plate 32. Plate 32 is countersunk into the adjacent front surface 21 of body 20. In these instances complementary teeth will be formed on the lower surface of cup 28, to engage the teeth 34, whereby to hold said rod 23 in predetermined adjusted position.

A flat member 35 is attached in a rigid manner to rod 23 near its free end and assumes a vertical position, whereby to act as a rudder to aid in directing the path of said plug 20. Member 35 will serve also as a decoy for alluring the fish.

Flat member 35 shown in Fig. 4 may extend both below and above rod 22, as illustrated in Fig. 6 if desired, whereby to serve as a rudder.

Having thus described my invention what I claim as new and desire to secure by Letters Patent is as follows:

1. In a trolling plug, a rod disposed adjacent to the front of said trolling plug, another rod pivotally mounted on said first named rod, and adapted to swing transversely of said trolling plug, a cup member mounted on said second named rod for engaging said trolling plug, and means for holding said cup member and said rod in predetermined relation to said trolling plug.

2. In a trolling plug, a rod disposed adjacent to the front part of said trolling plug, another rod pivotally mounted on said first named rod, and adapted to swing transversely of said trolling plug, a cup member mounted on said second named rod for engaging said trolling plug, a rudder member attached to said second named rod to serve as a rudder and as a decoy, and a spring disposed between said rudder and said cup member, whereby to hold said second named rod in predetermined position.

3. In a trolling plug, a rod disposed adjacent to the front of said trolling plug, another rod pivotally mounted on said first named rod, and adapted to swing transversely of said trolling plug, a cup member mounted on said second named rod for engaging said trolling plug, a groove formed in said trolling plug for partially housing said cup member, a rudder member attached to said second named rod to serve as a rudder and as a decoy, and a spring disposed between said rudder and said cup member, whereby to hold said cup and said second named rod in predetermined relation to said trolling plug.

4. In a trolling plug, a rod disposed adjacent to the front of said trolling plug, teeth formed on said trolling plug, another rod pivotally mounted to said first named rod, and adapted to swing transversely of said trolling plug, a cup member mounted on said second named rod, teeth formed on said cup member for engaging the teeth on said trolling plug, and spring means for holding said cup member in predetermined relation to said trolling plug.

FAUST S. DE LONG.